United States Patent
Cho

(10) Patent No.: US 11,338,762 B2
(45) Date of Patent: May 24, 2022

(54) PEDESTRIAN PROTECTION APPARATUS AND METHOD

(71) Applicant: HYUNDAI MOBIS CO., LTD., Seoul (KR)

(72) Inventor: Woong Lae Cho, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 157 days.

(21) Appl. No.: 16/794,953

(22) Filed: Feb. 19, 2020

(65) Prior Publication Data

US 2020/0262384 A1 Aug. 20, 2020

(30) Foreign Application Priority Data

Feb. 20, 2019 (KR) ........................ 10-2019-0019781

(51) Int. Cl.
| | | |
|---|---|---|
| *B60R 21/34* | (2011.01) | |
| *G08G 1/16* | (2006.01) | |
| *B60R 21/0134* | (2006.01) | |
| *B60R 21/0132* | (2006.01) | |
| *B60R 21/00* | (2006.01) | |

(52) U.S. Cl.
CPC .......... *B60R 21/34* (2013.01); *B60R 21/0132* (2013.01); *B60R 21/0134* (2013.01); *G08G 1/166* (2013.01); *B60R 2021/003* (2013.01)

(58) Field of Classification Search
CPC . B60R 21/34; B60R 21/0132; B60R 21/0134; G08G 1/16; G08G 1/166
See application file for complete search history.

(56) References Cited

U.S. PATENT DOCUMENTS

| 8,798,867 | B2 | 8/2014 | Stoll et al. | |
|---|---|---|---|---|
| 10,293,780 | B2* | 5/2019 | Ewert | B60R 21/34 |
| 2005/0131646 | A1* | 6/2005 | Camus | G01S 3/7864 |
| | | | | 701/301 |
| 2007/0032952 | A1* | 2/2007 | Carlstedt | B60W 30/085 |
| | | | | 701/301 |
| 2011/0125372 | A1* | 5/2011 | Ito | G08G 1/166 |
| | | | | 701/45 |

(Continued)

FOREIGN PATENT DOCUMENTS

| CN | 103204124 | 7/2013 |
|---|---|---|
| DE | 10334699 | 2/2005 |

(Continued)

*Primary Examiner* — Tan Q Nguyen
(74) *Attorney, Agent, or Firm* — H.C. Park & Associates, PLC

(57) ABSTRACT

A pedestrian protection apparatus includes: an active sensor configured to sense a dynamic behavior of a vehicle; a passive sensor configured to sense a collision of the vehicle; and a pedestrian protection module configured to: predict a possibility of a pedestrian collision in response to active information received from the active sensor, the pedestrian collision being a collision of the vehicle that involves a pedestrian; adjust a threshold value for sensing the collision of the vehicle determined by passive information received from the passive sensor in response to predicting the possibility of the pedestrian collision; and deploy a protection module in response to determining the pedestrian collision using the adjusted threshold value and the passive information received from the passive sensor.

8 Claims, 2 Drawing Sheets

(56) References Cited

U.S. PATENT DOCUMENTS

| | | | |
|---|---|---|---|
| 2011/0153262 A1* | 6/2011 | Furuta | B60R 21/0136 |
| | | | 702/141 |
| 2013/0184940 A1* | 7/2013 | Stoll | B60R 21/01 |
| | | | 701/45 |
| 2015/0224956 A1* | 8/2015 | Takenaka | B60R 21/38 |
| | | | 73/862.381 |
| 2018/0178745 A1 | 6/2018 | Foltin | |

FOREIGN PATENT DOCUMENTS

| | | |
|---|---|---|
| DE | 102013212092 | 1/2015 |
| DE | 102015226464 | 6/2017 |
| DE | 102016210470 | 12/2017 |
| DE | 102016226040 | 6/2018 |
| JP | 6136871 | 5/2017 |

* cited by examiner

PEDESTRIAN PROTECTION APPARATUS AND METHOD

CROSS-REFERENCE TO RELATED APPLICATION

This application claims priority from and the benefit of Korean Patent Application No. 10-2019-0019781, filed on Feb. 20, 2019, which is incorporated by reference for all purposes set forth herein.

BACKGROUND

Field

Exemplary embodiments relate to a pedestrian protection apparatus and method.

Discussion of the Background

As a vehicle technology is developed, various apparatuses are being developed. Particularly, a pedestrian protection apparatus is an apparatus capable of determining a pedestrian around a vehicle to protect the pedestrian at the time of a collision.

At the time of a pedestrian collision, the related pedestrian protection apparatus senses the collision through an air-bag control unit (ACU), an external front impact sensor (FIS), a pressure sensor, and an optical fiber sensor, and deploys the protection apparatus. The FIS, the pressure sensor, and the optical fiber sensor may be mounted on the front surface of a vehicle to sense the pedestrian collision in the front of the vehicle, but in the current structure, since a small collision signal is sensed for a collision with a small impact amount such as a pedestrian test, the deployment timing of the protection apparatus may be delayed or the protection apparatus may not be deployed.

At present, in order to cope with such a problem, the pedestrian collision is determined through an X axis signal of the vehicle by using a plurality of sensors on the front bumper back beam and bumper skin of the vehicle or pressure sensor data. However, in such a method, since cost increases due to the use of the plurality of sensors or it is not difficult to discriminate pedestrians only by using passive sensor signals, erroneous deployment or non-deployment of the protection apparatus may occur or a time to fire (TTF) may be delayed.

Since the related art described above is technical information possessed by the inventor for the derivation of the present disclosure or acquired in the derivation process of the present disclosure, it may not be necessarily said to be a publicly known technique disclosed to the general public before filing the application for the present disclosure.

SUMMARY

Exemplary embodiments of the present invention are directed to substantially preventing erroneous deployment of a protection apparatus by discriminating pedestrians and vehicles and estimating collisions of the pedestrians by utilizing active information of an active sensor.

Various embodiments are directed to advancing a time to fire (TTF) of a protection apparatus and securing reliability by adjusting a threshold value for a passive sensor based on pedestrian collision estimation.

According to one or more exemplary embodiments, a pedestrian protection apparatus includes: an active sensor configured to sense a dynamic behavior of a vehicle; a passive sensor configured to sense a collision of the vehicle; and a pedestrian protection module configured to: predict a possibility of a pedestrian collision in response to active information received from the active sensor, the pedestrian collision being a collision of the vehicle that involves a pedestrian; adjust a threshold value for sensing the collision of the vehicle determined by passive information received from the passive sensor in response to predicting the possibility of the pedestrian collision; and deploy a protection module in response to determining the pedestrian collision using the adjusted threshold value and the passive information received from the passive sensor.

The active sensor may include at least one of a camera and a radar sensor.

The passive sensor may include at least one of an acceleration sensor and a pressure sensor.

The pedestrian protection module may include: a collision prediction unit configured to predict the possibility of the pedestrian collision using at least one of a relative distance to the pedestrian as an obstacle, a collision time, and a relative speed, extracted from the active information received from the active sensor; a threshold value adjustment unit configured to adjust the threshold value to one of a first threshold value and a second threshold value different from the first threshold value, according to the predicted possibility of the pedestrian collision; a collision determination unit configured to determine the pedestrian collision by comparing the adjusted threshold value with acceleration information and pressure information extracted from the passive information; and a control unit configured to deploy the protection module in response to determining the pedestrian collision.

The collision determination unit may be configured to compare the passive information normalized according to a speed of the vehicle with the adjusted threshold value.

According to one or more exemplary embodiments, a pedestrian protection method includes: sensing, by an active sensor, a dynamic behavior of a vehicle; sensing, by a passive sensor, a collision of the vehicle; and predicting, by a pedestrian protection module, a possibility of a pedestrian collision in response to active information received from the active sensor, adjusting, by a pedestrian protection module, a threshold value for sensing the collision of the vehicle determined by passive information received from the passive sensor in response to predicting the possibility of the pedestrian collision; and deploying, by a pedestrian protection module, a protection module in response to determining the pedestrian collision using the adjusted threshold value and the passive information received from the passive sensor.

The sensing of the dynamic behavior of the vehicle may include: sensing, by the active sensor including one or more of a camera and a radar sensor, the dynamic behavior of the vehicle.

The sensing of the collision of the vehicle may include: sensing, by the passive sensor including one or more of an acceleration sensor and a pressure sensor, the collision of the vehicle.

The predicting the possibility of the pedestrian collision may include: predicting, by a collision prediction unit, the possibility of the pedestrian collision by using at least one of a relative distance to the pedestrian as an obstacle, a collision time, and a relative speed extracted from the active information received from the active sensor. The adjusting the threshold value may include: adjusting, by a threshold value adjustment unit, the threshold value to one of a first threshold value and a second threshold value different from the first threshold value, according to the predicted possibility of the pedestrian collision. The deploying the protection module may include: determining, by a collision determination unit, the pedestrian collision by comparing the adjusted threshold value with acceleration information and pressure information extracted from the passive information; and deploying, by a control unit, the protection module in response to determining the pedestrian collision.

The determining of the pedestrian collision may include: comparing the passive information normalized according to a speed of the vehicle with the adjusted threshold value.

In addition, other methods and other systems for implementing the present disclosure and computer programs for executing the methods may be further provided.

Other aspects, features, and advantages other than the above will be apparent from the following drawings, claims and detailed description of the disclosure.

According to the embodiments, it is possible to substantially prevent erroneous deployment of the protection apparatus by discriminating pedestrians and vehicles and estimating collisions of the pedestrians by utilizing the active information of the active sensor.

It is possible to advance a time to fire (TTF) of the protection apparatus and secure reliability by adjusting the threshold value for the passive sensor based on the pedestrian collision estimation.

The effects of the present disclosure are not limited to those mentioned above and other unmentioned effects will be clearly understood by those skilled in the art from the following description.

DETAILED DESCRIPTION OF THE ILLUSTRATED EMBODIMENTS

Figure 1:
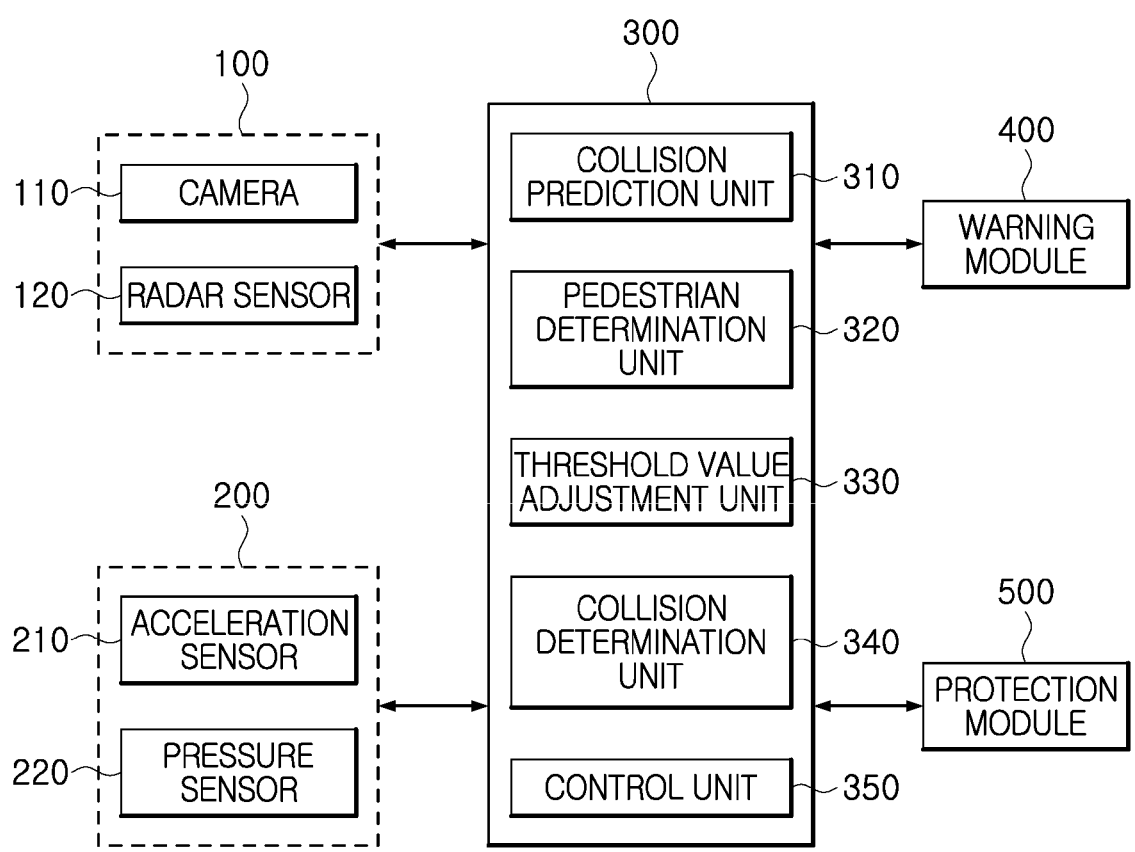
FIG. 1 is a diagram for schematically explaining a pedestrian protection apparatus in accordance with an embodiment of the present disclosure.

The advantages and features of the present disclosure and methods for achieving them will become readily apparent by reference to the following detailed description when considered in conjunction with the accompanying drawings. However, the present disclosure is not limited to embodiments to be described below, may be realized in various forms, and should be construed to include all modifications, equivalents, and alternatives falling within the spirit and scope of the disclosure. The embodiments to be described below are provided to bring the disclosure of the present disclosure to perfection and assist those skilled in the art to completely understand the scope of the present disclosure in the technical field to which the present disclosure pertains. Detailed descriptions related to well-known functions or configurations will be ruled out in order not to unnecessarily obscure subject matters of the present disclosure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, components, or combinations thereof, but do not preclude the presence or addition of one or more other features, integers, steps, operations, elements, components, or combinations thereof. The terms such as first and second may be used to describe various elements, but the elements are not limited by the terms, and the terms are used only to distinguish one element from another element.

Hereafter, embodiments in accordance with the present disclosure will be described in detail with reference to the accompanying drawings. In the description with reference to the accompanying drawings, same or corresponding elements are denoted by the same reference numerals and redundant description thereof will be omitted.

As publicly known in the art, some of exemplary embodiments may be illustrated in the accompanying drawings from the viewpoint of function blocks, units and/or modules. Those skilled in the art will understood that such blocks, units and/or modules are physically implemented by electronic (or optical) circuits such as logic circuits, discrete components, processors, hard wired circuits, memory devices and wiring connections. When the blocks, units and or modules are implemented by processors or other similar hardware, the blocks, units and modules may be programmed and controlled through software (for example, codes) in order to perform various functions discussed in this specification. Furthermore, each of the blocks, units and/or modules may be implemented by dedicated hardware or a combination of dedicated hardware for performing some functions and a processor for performing another function (for example, one or more programmed processors and related circuits). In some exemplary embodiments, each of the blocks, units and/or modules may be physically divided into two or more blocks, units and or modules which are interactive and discrete, without departing from the scope of the disclosure. Furthermore, blocks, units and/or modules in some exemplary embodiments may be physically coupled as a more complex block, unit and/or module without departing from the scope of the disclosure.

FIG. 1 is a diagram for schematically explaining a pedestrian protection apparatus 1 in accordance with an embodiment of the present disclosure. Referring to FIG. 1, the pedestrian protection apparatus 1 may include an active sensor 100, a passive sensor 200, a pedestrian protection module 300, a warning module 400, and a protection module 500.

The active sensor 100 is a sensor that senses a dynamic behavior of a vehicle and may include a camera 110 and a radar sensor 120. The camera 110 may photograph an obstacle in front of the vehicle and check whether the obstacle is a person or an object, and the radar sensor 120 may sense the presence or absence of an obstacle (a person, an object and the like) in front of the vehicle and a distance. Active information sensed by the active sensor 100 including the camera 110 and the radar sensor 120 may be output to the pedestrian protection module 300. In the present embodiment, the camera 110 may sense an obstacle around the vehicle by using image photographing information and determine whether the obstacle is a pedestrian. The camera 110 may determine whether the obstacle is a pedestrian through image analysis, and determine that the obstacle is a pedestrian when a movement is detected by comparing images before and after the obstacle is determined as a pedestrian.

The passive sensor 200 is a sensor that senses a physical contact (collision) of the vehicle and may include an acceleration sensor 210 and a pressure sensor 220. The acceleration sensor 210 may sense an acceleration of the vehicle and the pressure sensor 220 may sense pressure when an obstacle has collided with the vehicle. Although not illustrated in the drawing, the passive sensor 200 may further include a wheel speed sensor that senses a speed of the vehicle. Passive information sensed by the passive sensor 200 including the acceleration sensor 210, the pressure sensor 220, and the wheel speed sensor may be output to the pedestrian protection module 300.

The pedestrian protection module 300 may determine a collision possibility of a pedestrian by using the active information received from the active sensor 100, adjust a threshold value for sensing the collision of the vehicle determined by the passive information received from the passive sensor 200 when there is the collision possibility of the pedestrian, and control the protection module 500 to be deployed when the collision of the pedestrian is determined using the adjustment result of the threshold value and the passive information.

The warning module 400 may output a warning phrase, warning sound and the like according to pedestrian determination, collision prediction, and collision determination under the control of the pedestrian protection module 300. The warning module 400 may comprise a speaker and/or display.

The protection module 500 may include an active hood lift, an airbag and the like, and may be deployed immediately after a collision to protect a pedestrian under the control of the pedestrian protection module 300.

In the present embodiment, the pedestrian protection module 300 may include a collision prediction unit 310, a pedestrian determination unit 320, a threshold value adjustment unit 330, a collision determination unit 340, and a control unit 350.

The collision prediction unit 310 may generate one or more of a relative distance to the pedestrian, a collision time, and a relative speed by using information of the pedestrian as an obstacle due to the image photographing and analysis of the camera 110, which is included in the active information, and information sensed by the radar sensor 120, and predict the collision possibility of the pedestrian by using one or more of the relative distance to the pedestrian, the collision time, and the relative speed. Depending on the collision possibility, the warning module 400 may output different types of warning information.

The pedestrian determination unit 320 may determine once more whether the pedestrian, who has been predicted to collide by the value of the acceleration sensor 210 included in the passive information, is an actual pedestrian or an object when the collision prediction unit 310 predicts the collision possibility.

The threshold value adjustment unit 330 may adjust a threshold value for collision determination to one of a first threshold value and a second threshold value different from the first threshold value, according to the collision possibility of the pedestrian. When there is no collision possibility of the pedestrian, the threshold value adjustment unit 330 may adjust the threshold value to the first threshold value, and when there is the collision possibility of the pedestrian, the threshold value adjustment unit 330 may adjust the threshold value to the second threshold value larger or smaller than the first threshold value. The threshold value may be used as a reference value later when the collision determination unit 340 determines a collision by using the passive information. Furthermore, the threshold value may be adjusted differently according to the type of the passive sensor 200.

The collision determination unit 340 may determine the collision of the pedestrian by comparing one of the first threshold value and the second threshold value with acceleration information and pressure information included in the passive information. That is, the collision determination unit 340 may secure determination robustness by determining the collision of the pedestrian by using both the acceleration information and the pressure information. Since the threshold value is adjusted by the active information of the active sensor 100, it can be seen that the collision determination unit 340 determines the collision of the pedestrian by using the active information of the active sensor 100 and the passive information of the passive sensor 200. Furthermore, the second threshold value may be adjusted differently according to the type of the passive sensor 200.

In a selective embodiment, in the aforementioned pedestrian collision determination, the collision determination unit 340 may additionally determine the pedestrian collision by an acceleration safing value and a pressure safing value. That is, the collision determination unit 340 may further include an acceleration safing sensor (not illustrated) and a pressure safing sensor (not illustrated) for substantially preventing erroneous operations of the acceleration sensor and the pressure sensor, and may determine the pedestrian collision by comparing the acceleration safing value and the pressure safing value, which are output from the acceleration safing sensor and the pressure safing sensor, with a preset threshold value. In the present embodiment, it is possible to secure robustness of the pedestrian collision determination with two times of pedestrian collision determination such as pedestrian collision determination by the passive sensor 200 and pedestrian collision determination by the safing sensors.

Furthermore, the collision determination unit 340 may normalize the passive information received from the passive sensor 200 prior to the pedestrian collision determination according to the speed of the vehicle sensed by the wheel speed sensor, thereby substantially preventing the received passive information from varying according to the speed of the vehicle.

The control unit 350 may control the protection module 500 to be deployed when the pedestrian collision is determined according to the determination result of the collision determination unit 340.

Figure 2:
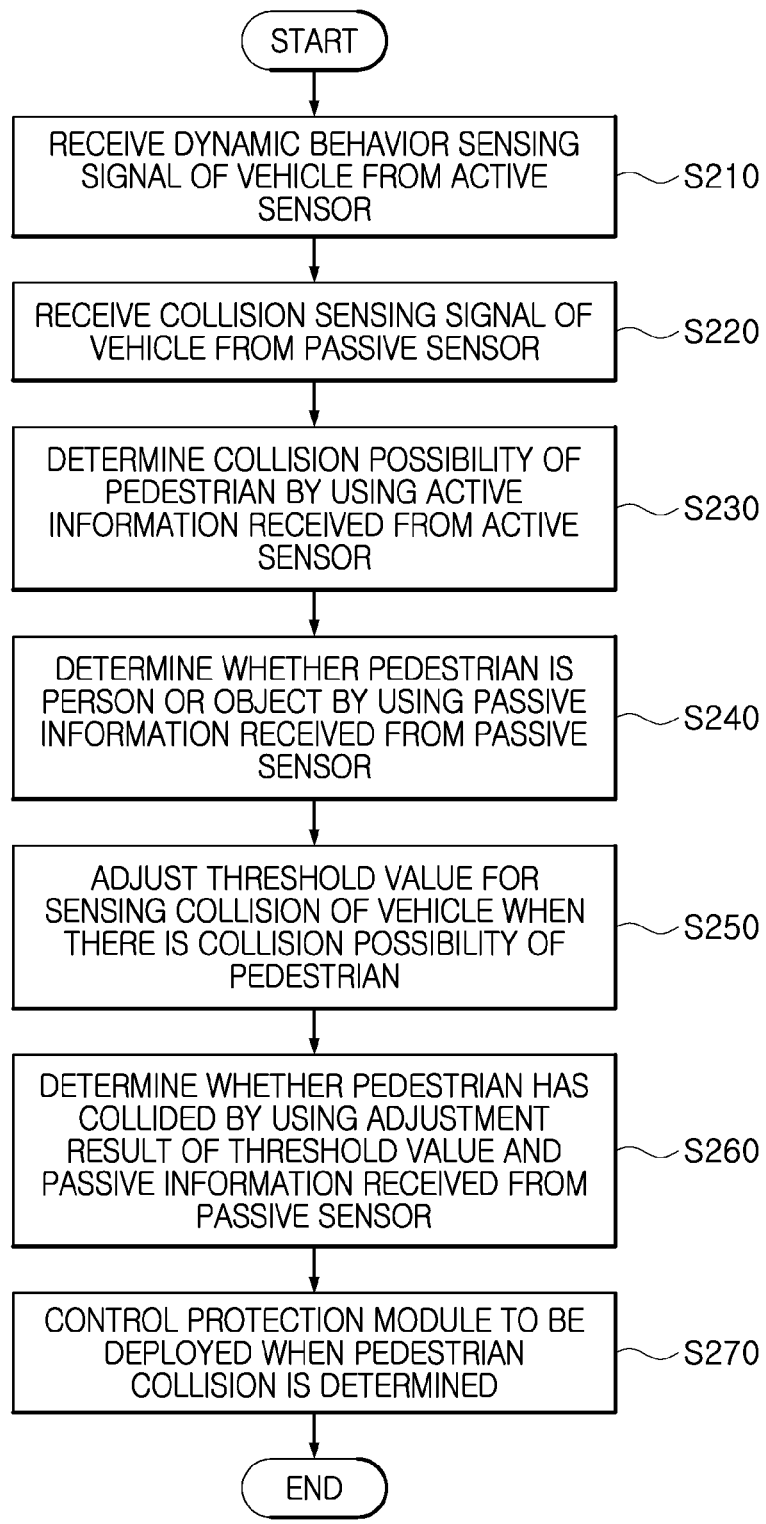
FIG. 2 is a flowchart for explaining a pedestrian protection method in accordance with an embodiment of the present disclosure.

FIG. 2 is a flowchart for explaining a pedestrian protection method in accordance with an embodiment of the present disclosure. In the following description, a description of parts overlapping the description of FIG. 1 will be omitted.

Referring to FIG. 2, in step S210, the pedestrian protection module 300 receives a dynamic behavior sensing signal of a vehicle from the active sensor 100. The active sensor 100 is a sensor that senses a dynamic behavior of the vehicle and may include the camera 110 and the radar sensor 120, wherein the camera 110 may photograph an obstacle in front of the vehicle and check whether the obstacle is a person or an object and the radar sensor 120 may sense the presence or absence of an obstacle (a person, an object and the like) in front of the vehicle and a distance. In the present embodiment, the pedestrian protection method may be performed only when both the camera 110 and the radar sensor 120 operate.

In step S220, the pedestrian protection module 300 receives a collision sensing signal of the vehicle from the passive sensor 200. The passive sensor 200 is a sensor that senses a physical contact (collision) of the vehicle and may include the acceleration sensor 210 and the pressure sensor 220, wherein the acceleration sensor 210 may sense an acceleration of the vehicle and the pressure sensor 220 may sense pressure when an obstacle has collided with the vehicle. Although not illustrated in the drawing, the passive sensor 200 may further include a wheel speed sensor that senses a speed of the vehicle.

In step S230, the pedestrian protection module 300 determines a collision possibility of a pedestrian by using the active information received from the active sensor 100. The pedestrian protection module 300 may generate one or more of a relative distance to the pedestrian, a collision time, and a relative speed by using information of the pedestrian as an obstacle, which is included in the active information and received from the camera 110, and information sensed by the radar sensor 120, and predict the collision possibility of the pedestrian by using one or more of the relative distance to the pedestrian, the collision time, and the relative speed. Depending on the collision possibility, the warning module 400 may output different types of warning information.

In step S240, the pedestrian protection module 300 determines once more whether the pedestrian, who has been predicted to collide by the value of the acceleration sensor 210 included in the passive information, is an actual pedestrian or an object when there is the collision possibility of the pedestrian, that is, when the collision possibility of the pedestrian is predicted.

In step S250, the pedestrian protection module 300 adjusts a threshold value for sensing a collision of the vehicle when there is the collision possibility of the pedestrian. When there is no collision possibility of the pedestrian, the pedestrian protection module 300 may adjust the threshold value to the first threshold value, and when there is the collision possibility of the pedestrian, the pedestrian protection module 300 may adjust the threshold value to the second threshold value larger or smaller than the first threshold value. The threshold value may be used as a reference value later when the collision determination unit 340 determines a collision by using the passive information. Furthermore, the threshold value may be adjusted differently according to the type of the passive sensor 200.

In step S260, the pedestrian protection module 300 determines whether the pedestrian has collided by using the adjustment result of the threshold value and the passive information received from the passive sensor 200. The pedestrian protection module 300 may secure determination robustness by determining the collision of the pedestrian by using both the acceleration information and the pressure information. Furthermore, the pedestrian protection module 300 may normalize the passive information received from the passive sensor 200 prior to the pedestrian collision determination according to the speed of the vehicle sensed by the wheel speed sensor, thereby substantially preventing the received passive information from varying according to the speed of the vehicle.

In a selective embodiment, in the aforementioned pedestrian collision determination, the pedestrian protection module 300 may additionally determine the pedestrian collision by the acceleration safing value and the pressure safing value. That is, the pedestrian protection module 300 may further include an acceleration safing sensor (not illustrated) and a pressure safing sensor (not illustrated) for substantially preventing erroneous operations of the acceleration sensor and the pressure sensor, and determine the pedestrian collision by comparing the acceleration safing value and the pressure safing value, which are output from the acceleration safing sensor and the pressure safing sensor, with a preset threshold value. In the present embodiment, it is possible to secure robustness of the pedestrian collision determination with two times of pedestrian collision determination such as pedestrian collision determination by the passive sensor 200 and pedestrian collision determination by the safing sensors.

In step S270, the pedestrian protection module 300 controls the protection module 500 to be deployed when the pedestrian collision is determined.

The embodiment of the present disclosure described above may be implemented in the form of a computer program executable through various components on a computer, and the computer program may be recorded on a computer readable medium. The medium may include a magnetic medium such as a hard disk, a floppy disk, and a magnetic tape, an optical recording medium such as a CD-ROM and a DVD, a magneto-optical medium such as a floptical disk, and a hardware device, such as a ROM, a RAM, and a flash memory, which is specially configured to store and execute program instructions.

Meanwhile, the computer program may be specially designed and configured for the present disclosure or may be known to and available by those skilled in a computer software field. An example of the computer program may include not only machine codes generated by a compiler, but also high-level language codes executable by a computer using an interpreter and the like.

In the specification (particularly, in the claims) of the present disclosure, the use of the term "the" and an indication term similar thereto may correspond to both the singular and the plural. Furthermore, in the present disclosure, when a range is described, it includes the disclosure employing individual values belonging to the range (unless otherwise defined) and is the same as describing each individual value constituting the range in the detailed description of the disclosure.

When an order is clearly stated for steps constituting the method in accordance with the present disclosure or there is no contrary description, the steps may be executed in a suitable order. The present disclosure is not necessarily limited to the description order of the steps. In the present disclosure, the use of all examples or exemplary terms (for example, and the like) is for specifically describing the present disclosure, and the scope of the present disclosure is not limited by the examples or exemplary terms unless limited by the claims. Furthermore, those skilled in the art may recognize that various modifications, combinations, and changes may be made depending on design conditions and factors within the scope of the appended claims or equivalents thereof.

Accordingly, the spirit of the present disclosure should not be limited to the aforementioned embodiment and not only the claims to be described later but also all ranges equivalent to the claims or equivalently changed from the claims fall within the scope of the spirit of the present disclosure.

What is claimed is:

1. A pedestrian protection apparatus comprising:
an active sensor configured to sense a dynamic behavior of a vehicle;
a passive sensor configured to sense a collision of the vehicle; and
a pedestrian protection module configured to:
predict a possibility of a pedestrian collision in response to active information received from the active sensor, the pedestrian collision being a collision of the vehicle that involves a pedestrian;

adjust a threshold value for sensing the collision of the vehicle determined by passive information received from the passive sensor in response to predicting the possibility of the pedestrian collision; and deploy a protection module in response to determining the pedestrian collision using the adjusted threshold value and the passive information received from the passive sensor, wherein the pedestrian protection module comprises:

a collision prediction unit configured to predict the possibility of the pedestrian collision using at least one of a relative distance to the pedestrian as an obstacle, a collision time, and a relative speed, extracted from the active information received from the active sensor;

a threshold value adjustment unit configured to adjust the threshold value to one of a first threshold value and a second threshold value different from the first threshold value, according to the predicted possibility of the pedestrian collision;

a collision determination unit configured to determine the pedestrian collision by comparing the adjusted threshold value with acceleration information and pressure information extracted from the passive information; and a control unit configured to deploy the protection module in response to determining the pedestrian collision.

2. The pedestrian protection apparatus according to claim 1, wherein the active sensor comprises at least one of a camera and a radar sensor.

3. The pedestrian protection apparatus according to claim 1, wherein the passive sensor comprises at least one of an acceleration sensor and a pressure sensor.

4. The pedestrian protection apparatus according to claim 1, wherein the collision determination unit is configured to compare the passive information normalized according to a speed of the vehicle with the adjusted threshold value.

5. A pedestrian protection method comprising:

sensing, by an active sensor, a dynamic behavior of a vehicle;

sensing, by a passive sensor, a collision of the vehicle; and predicting, by a pedestrian protection module, a possibility of a pedestrian collision in response to active information received from the active sensor, adjusting, by a pedestrian protection module, a threshold value for sensing the collision of the vehicle determined by passive information received from the pas-sive sensor in response to predicting the possibility of the pedestrian collision; and deploying, by a pedestrian protection module, a protection module in response to determining the pedestrian collision using the adjusted threshold value and the passive information received from the passive sensor, wherein the predicting the possibility of the pedestrian collision comprises: predicting, by a collision prediction unit, the possibility of the pedestrian collision by using at least one of a relative distance to the pedestrian as an obstacle, a collision time, and a relative speed extracted from the active information received from the active sensor, wherein the adjusting the threshold value comprises: adjusting, by a threshold value adjustment unit, the threshold value to one of a first threshold value and a second threshold value different from the first threshold value, according to the predicted possibility of the pedestrian collision, and wherein the deploying the protection module comprises:

determining, by a collision determination unit, the pedestrian collision by comparing the adjusted threshold value with acceleration information and pressure information extracted from the passive information; and deploying, by a control unit, the protection module in response to determining the pedestrian collision.

6. The pedestrian protection method according to claim 5, wherein the sensing of the dynamic behavior of the vehicle comprises:

sensing, by the active sensor comprising one or more of a camera and a radar sensor, the dynamic behavior of the vehicle.

7. The pedestrian protection method according to claim 5, wherein the sensing of the collision of the vehicle comprises:

sensing, by the passive sensor comprising one or more of an acceleration sensor and a pressure sensor, the collision of the vehicle.

8. The pedestrian protection method according to claim 5, wherein, the determining of the pedestrian collision comprises:

comparing the passive information normalized according to a speed of the vehicle with the adjusted threshold value.

* * * * *